(12) United States Patent
Carlson

(10) Patent No.: US 6,189,874 B1
(45) Date of Patent: Feb. 20, 2001

(54) X-CONFIGURATION ENGINE MOUNTING

(75) Inventor: Holly Marie Carlson, Erie, PA (US)

(73) Assignee: Lord Corporation, Cary, NC (US)

(*) Notice: Under 35 U.S.C. 154(b), the term of this patent shall be extended for 0 days.

(21) Appl. No.: 09/056,420

(22) Filed: Apr. 6, 1998

Related U.S. Application Data

(63) Continuation-in-part of application No. 08/886,854, filed on Jul. 1, 1997, now Pat. No. 5,944,297.

(51) Int. Cl.⁷ ........................................ F16F 7/00
(52) U.S. Cl. ..................... 267/141; 267/153; 248/638
(58) Field of Search ................. 267/140.5, 141, 267/141.1, 141.7, 153; 188/321.11; 248/638

(56) References Cited

U.S. PATENT DOCUMENTS

| | | |
|---|---|---|
| 2,322,844 | 6/1943 | Goldschmidt . |
| 2,729,442 | 1/1956 | Neidhart . |
| 2,858,127 | 10/1958 | Moulton . |
| 2,891,744 | 6/1959 | Hirst et al. . |
| 2,948,502 | 8/1960 | Hutton . |
| 3,242,877 | 3/1966 | Hirst et al. . |
| 3,322,377 * | 5/1967 | Morlon ................................ 207/153 |
| 4,183,496 | 1/1980 | Brock et al. . |
| 4,504,036 | 3/1985 | Passarell et al. ...................... 248/632 |
| 4,660,797 | 4/1987 | Tonnies . |
| 4,717,130 * | 1/1988 | Barkhage ............................ 268/141 |
| 4,733,854 | 3/1988 | Miyamoto . |
| 4,768,611 | 9/1988 | Schmitt ................................ 180/300 |
| 4,871,152 | 10/1989 | Funahashi . |
| 4,958,811 | 9/1990 | Brenner et al. . |
| 4,958,812 | 9/1990 | Wolf et al. . |
| 5,024,425 | 6/1991 | Schwerdt . |
| 5,042,785 | 8/1991 | LeFol et al. . |
| 5,052,500 | 10/1991 | Ohtsu . |
| 5,116,030 | 5/1992 | Nowak et al. . |
| 5,123,634 | 6/1992 | Schwerdt . |
| 5,156,380 * | 10/1992 | Cerruti et al. ...................... 267/153 |
| 5,449,152 | 9/1995 | Byrnes et al. . |

FOREIGN PATENT DOCUMENTS

| | | |
|---|---|---|
| 0342074 | 11/1989 | (EP) . |
| 0 875 962 | 11/1998 | (EP) . |
| 2768661 | 3/1999 | (FR) . |
| 1516572 | 7/1978 | (GB) . |

OTHER PUBLICATIONS

A. B. Davey et al. "Rubber in Engineering Practice", Rubber and Plastics Research Asso., Palmerton Publishing Co. Inc. 1964; pp. 378–379.

* cited by examiner

Primary Examiner—Matthew C. Graham
(74) Attorney, Agent, or Firm—Stanley B. Kita; Randall S. Wayland

(57) ABSTRACT

A mount for isolating a vibrating member from its support. In several embodiments an elastomeric element is made up of four components that are preferably bonded to the inclined outer surface of an inner member and the inclined inner surface of an outer member. One of the inner and outer members is bifurcated and drawing the two halves into mating engagement results in the elastomeric components being preloaded simultaneously in compression and shear. The elastomeric element is preferably formed with portions which snub movement in each of three orthogonal directions. The dimensions of the pair of elastomeric components above or below the vibrating member may be different than the other pair since the greater compression strain on one pair of components to maintain maximum design stress levels. In another embodiment, the inner and outer members are each a single component with four elastomeric elements bonded between metal plates and preloaded between the inner and outer surfaces of the members in an X-like configuration.

14 Claims, 16 Drawing Sheets

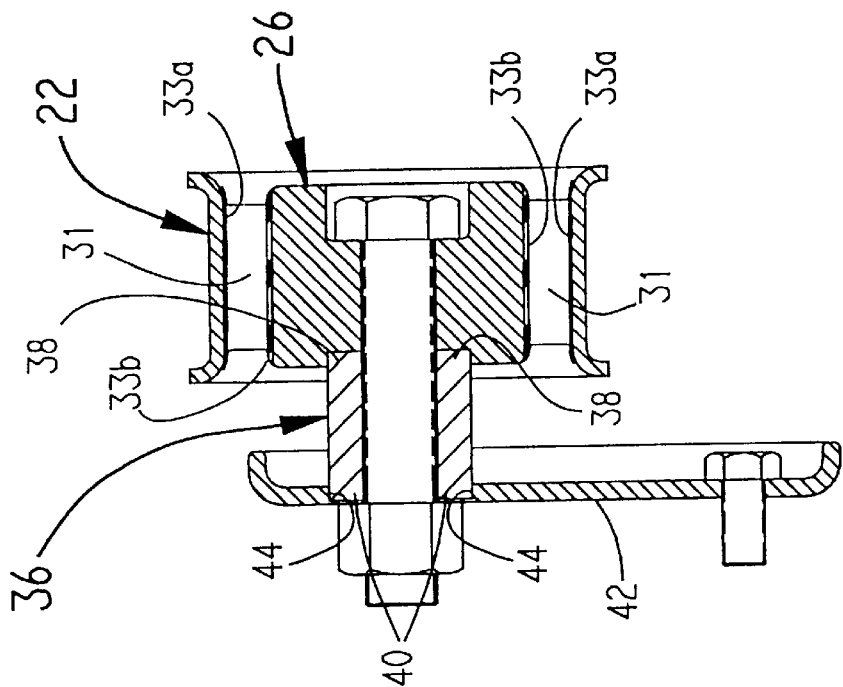
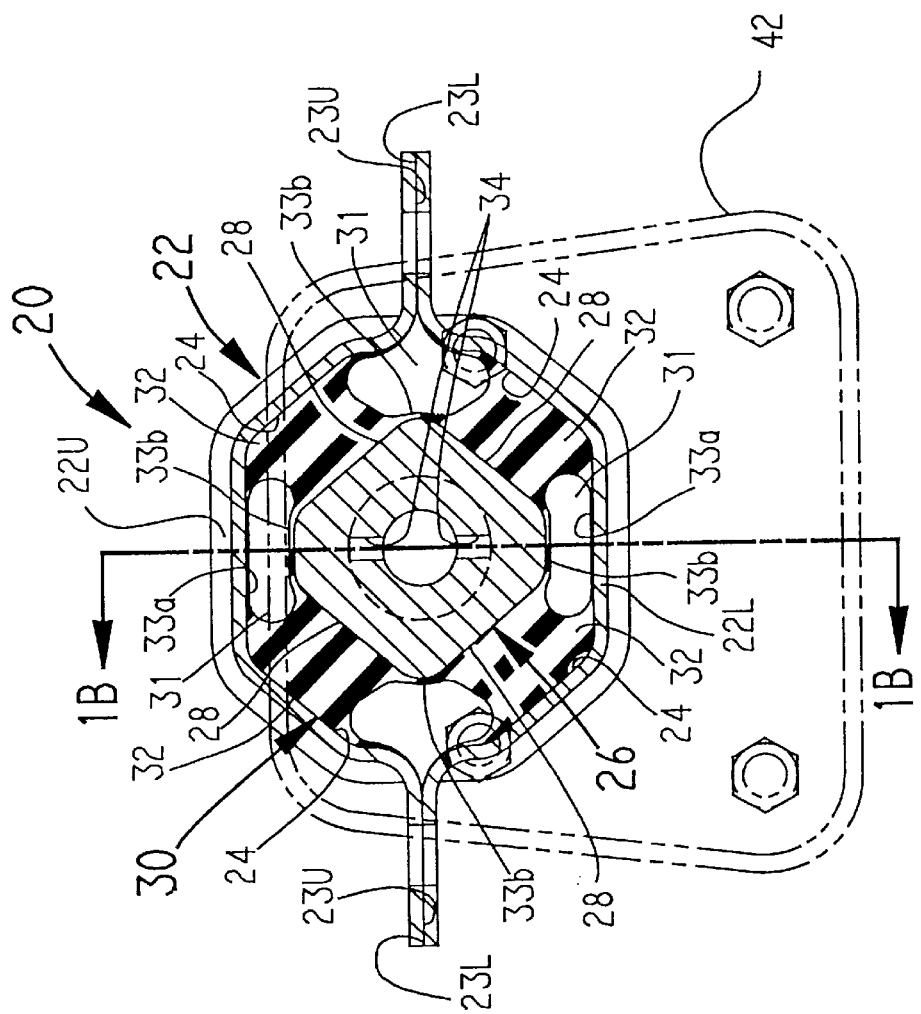
Fig. 1B
Fig. 1A

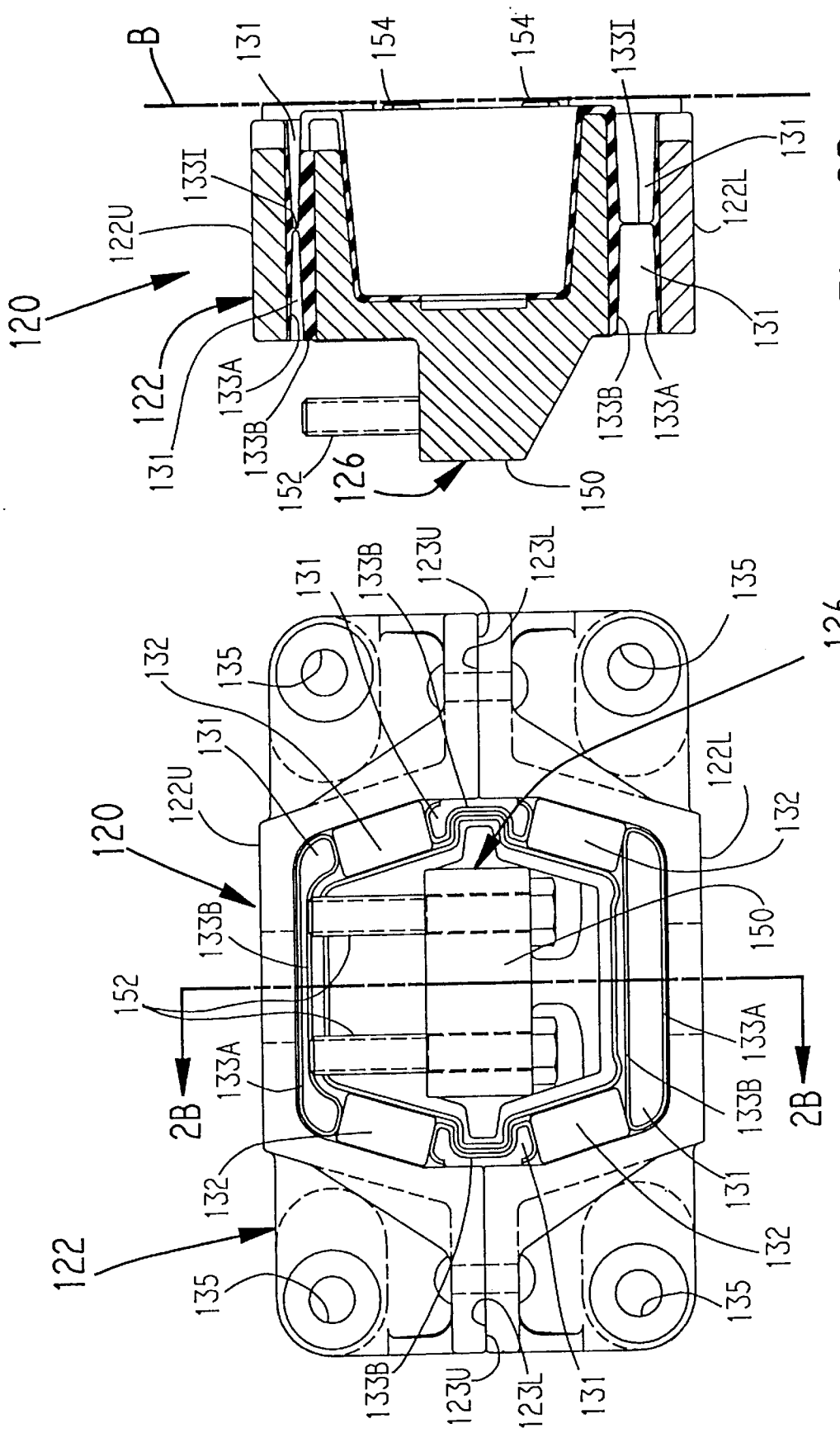

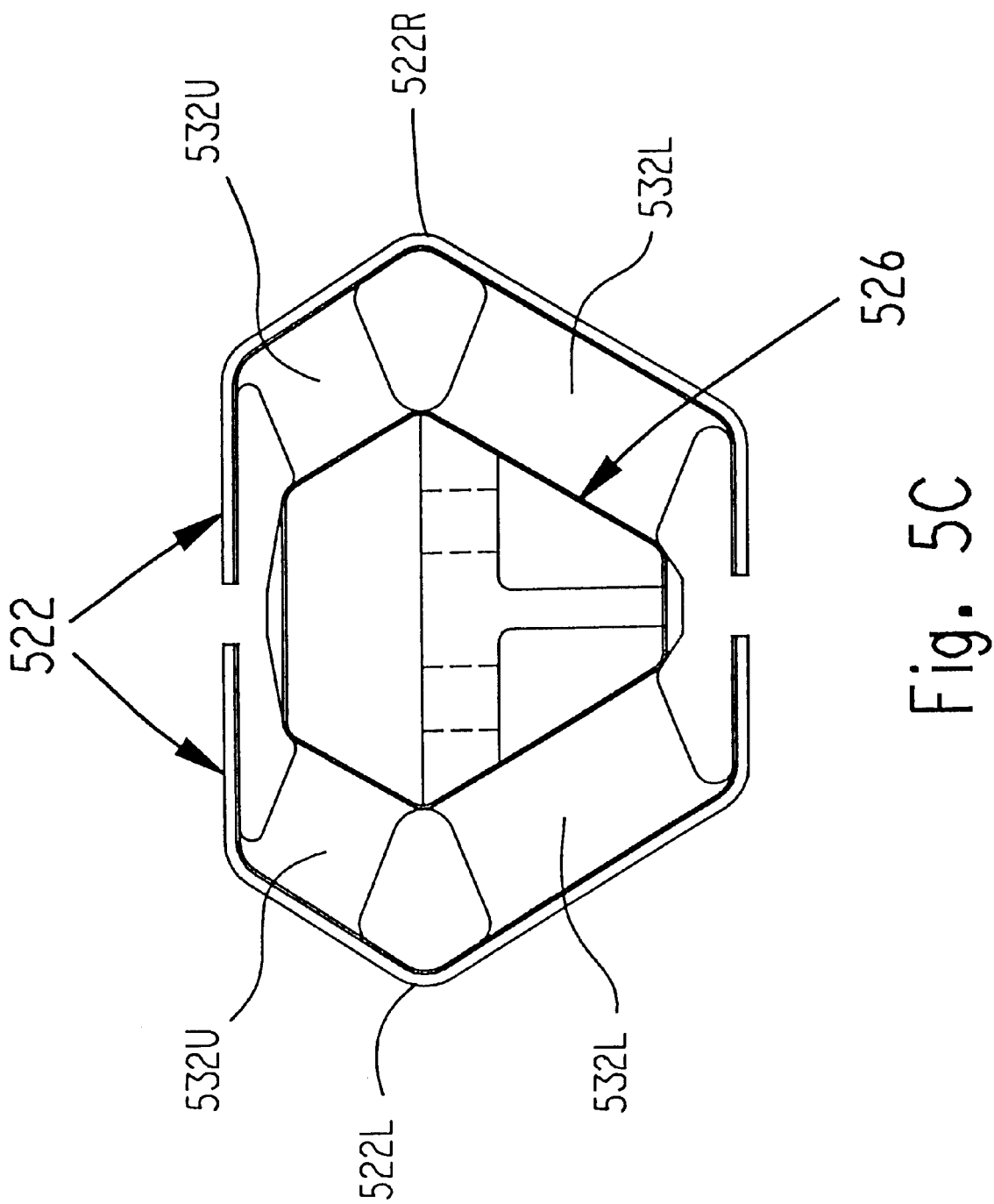

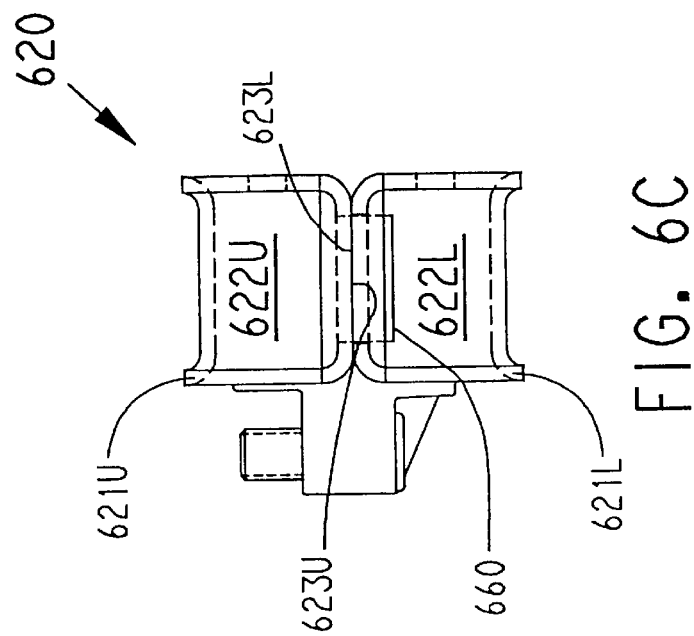
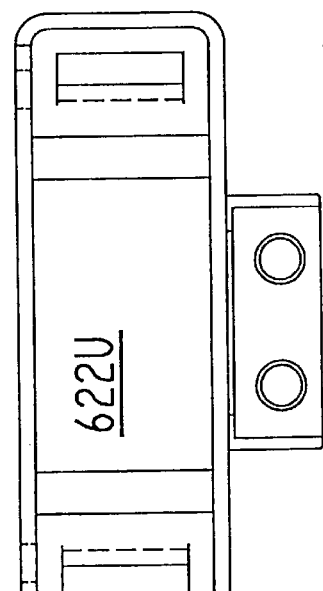
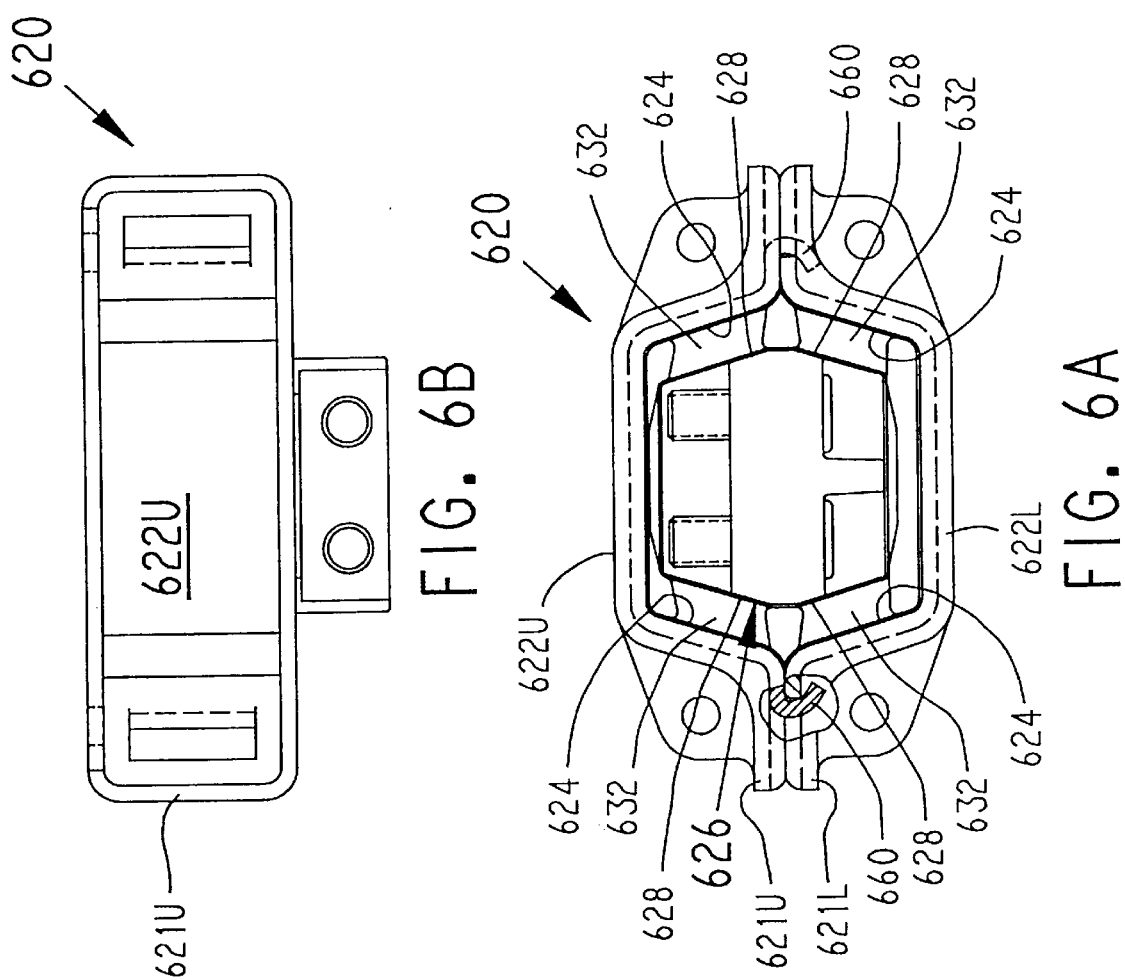

X-CONFIGURATION ENGINE MOUNTING

RELATED APPLICATION

This is a continuation-in-part of application Ser. No. 08/886,854, filed Jul. 1, 1997 now U.S. Pat. No. 5,944,297.

BACKGROUND AND SUMMARY OF THE INVENTION

The present invention is directed to an elastomeric mount of the type used to support and isolate an engine from a vehicle chassis. More particularly the present invention is directed to a mount which has four preferably inclined elastomeric elements, each of which is simultaneously preloaded in compression and shear.

In applications involving off-highway equipment, elastomeric mounts must be rugged to take the pounding from traversing unimproved roads. In addition, these mounts should be designed to avoid total disconnect of the power train from the support in the event of elastomer failure (i.e., they are safetied). Finally, the provision of snubbing in all three orthogonal directions protects the power train, improves subjective ride quality and reduces unwanted chatter caused by metal-to-metal contact.

The mount of the present invention provides a safetied design that uses four preferably inclined elastomeric elements which are formed by spaced laterally extending compartments, and the elastomeric elements preferably being bonded to four outwardly facing faces of an inner member and to the four opposing inwardly facing faces of an outer member. Even should the elastomeric elements all fail, the inner member will be retained within the outer member. In several of the described embodiments, either of the inner or outer member is bifurcated into separate elements and, in preassembled condition, the elements are spaced such that opposed mating surfaces of the upper and lower elements are non-engaging. In its final assembled position, the two mating surfaces are brought together, preferably into engaging contact resulting in each of the elastomeric components experiencing preloading in both the compressive and shear directions. In Another embodiment, the inner and outer members are each one element, and the elastomeric components are bonded between parallel plates and preloaded between the opposing faces of the members. This preload results in superior wear life of the elastomeric elements. Snubbing is preferably provided in each of the three orthogonal directions to eliminate metal-to-metal contact and resulting mechanical chatter.

In one embodiment, the opposing surfaces of the inner and outer members are designed to be non-planar in order to increase the stiffness of the mount in a lateral direction. In other embodiments, auxiliary lateral elements are used. This increase in spring rate raises the natural frequency of the mounting system out of an undesirable frequency range defined by the vehicle structure. In yet other embodiments, the bifurcated elements of the outer member interengage to maintain the mount in its assembled condition prior to installation. In still another embodiment, elastic assemblies are each formed as separate elements bonded between parallel edge plates for maximizing mold capacity, and for reducing manufacturing cost. Precompression of the elastic assemblies between the inner and outer members serves to increase load-carrying capacity.

Various other features, advantages and characteristics of the present invention will become apparent after a reading of the following specification.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1A is a cross-sectional front view of a first embodiment of the mount of the present invention;

FIG. 1B is a cross-sectional side view of the first embodiment taken along line 1B—1B as seen in FIG. 1A;

FIG. 2A is front view of a second embodiment of mount;

FIG. 2B is a cross-sectional side view of the second embodiment as seen along line 2B—2B in FIG. 2A;

FIG. 5C is a front view of a sixth embodiment of the mount shown in a preassembled condition;

FIG. 6A is a front view of a seventh embodiment of the mount;

FIG. 6B is a top view of the seventh embodiment of the mount;

FIG. 6C is a side view of the seventh embodiment of the mount;

DETAILED DESCRIPTION OF THE PREFERRED EMBODIMENTS

Figure 1D:
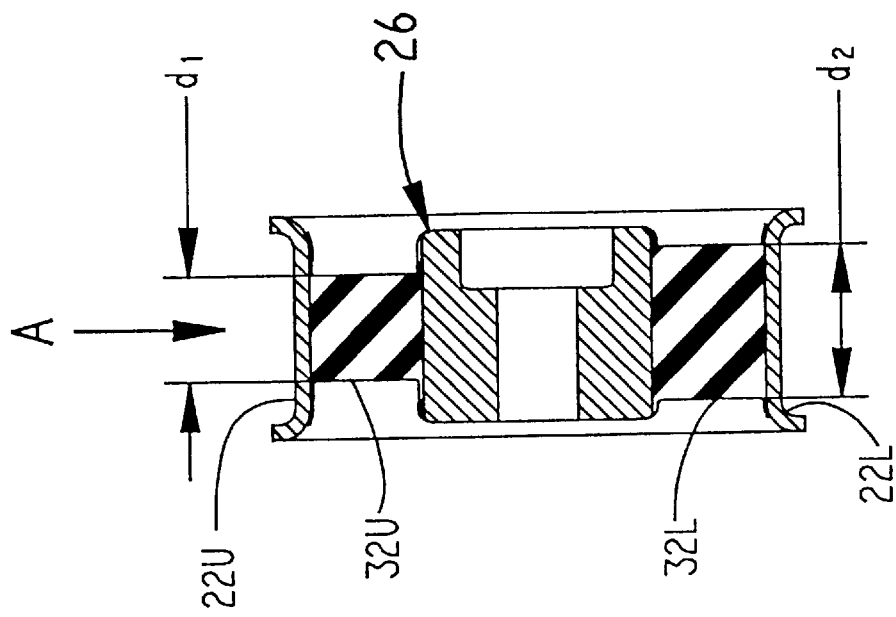
FIG. 1D is cross-sectional side view of one elastomeric component of the mount of the present invention as seen along line 1D—1D in FIG. 1C.

A first embodiment of the mount of the present invention is depicted in FIGS. 1A–1D generally at 20. Mount 20 includes outer member 22, inner member 26 encircled by outer member and an elastomeric element 30. Inner member 26 has four outwardly facing inclined surfaces 28 which oppose four inwardly facing inclined surfaces 24. Elastomeric element 30 is comprised of four preferably interconnected components 32, one each of which is positioned between and, preferably bonded to, inclined surfaces 24 and 28. In this embodiment, outer member 22 is bifurcated into upper element 22U and lower element 22L which have first (23U) and second (23L) mating surfaces, respectively. Elastomeric components 32 are spaced apart and separated by laterally extending compartments 31 while preferably being interconnected by elastomeric webs 33a and 33b. Webs 33a and 33b offer corrosion inhibiting coating to all otherwise exposed metallic surfaces on the outer (22) and inner (26) members with the further advantage of preventing metal-to-metal contact.

Figure 1C:
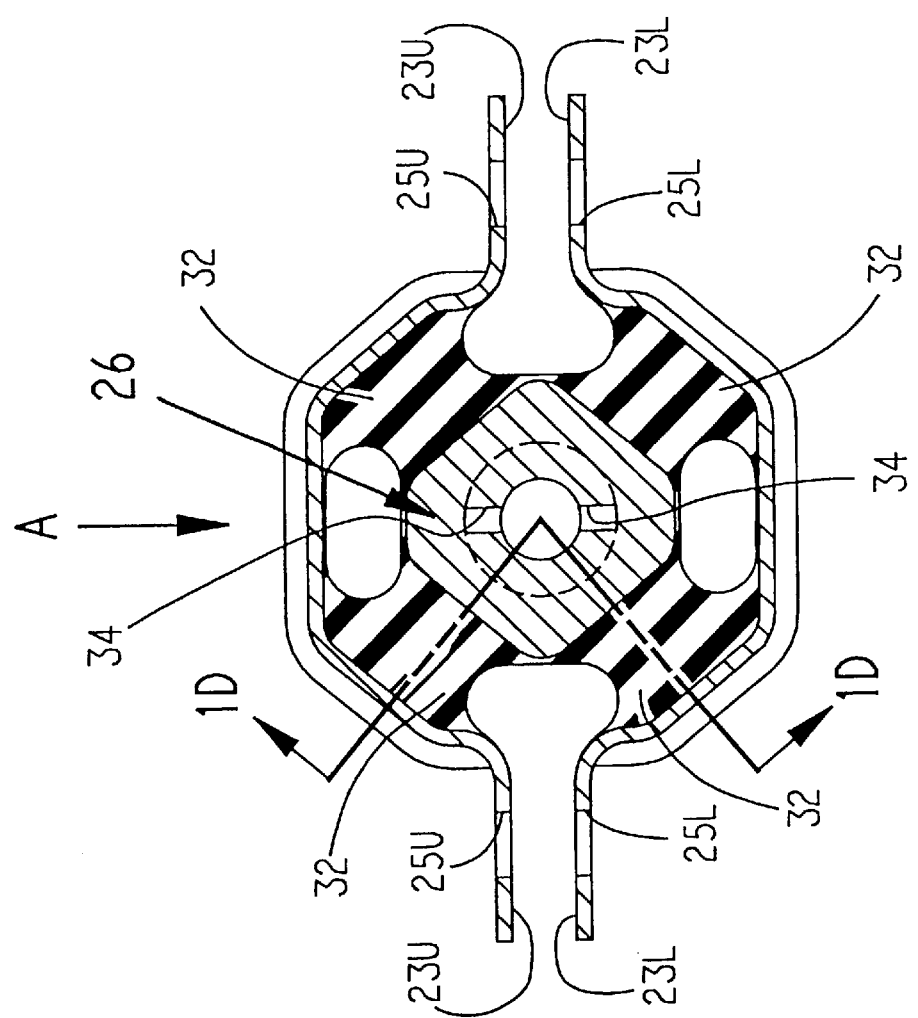
FIG. 1C is a cross-sectional front view of the first embodiment of the mount shown in the pre-installed condition.

As best seen in FIG. 1C, in its partially assembled condition, the thicknesses of the elastomeric components 32 are large enough such that the mating surfaces 23U and 23L are in non-engaging relationship. When bolts are inserted through apertures 25U, 25L formed in mating surfaces 23U, 23L, respectively, and those surfaces are drawn into contact, elastomeric components 32 are simultaneously preloaded in compression and shear to increase the durability of the elastomer (i.e., to extend its wear-life).

Now referring to FIGS. 1B and 1C, inner member 26 has a pair of notches 34 formed in one end which receive a pair of protrusions 38 extending from one end of an anti-rotation spacer 36. A like pair of protrusions 40 extending from the opposite end of spacer 36 are received in slot openings 44 in an adapter plate 42 which can be bolted to the engine or the support (not shown). The mating surfaces 23U and 23L are bolted to the other of said engine and said support. Typically, the inner member 26 will be attached to the engine and the outer member 22 to the support.

FIG. 1D is a cross-sectional view of the mount shown in FIG. 1C as seen along a section line 1D—1D. Since the static engine load (acting along a direction indicated by arrow A) creates increased compression strain on the lower elastomeric components 32L, those components will be more critical in providing the desired stiffness control of the mount than upper components 32U. Generally, a higher stiffness will be required in the lower elastomeric component 32L that the upper 32U to deter drift of the mount 20. Accordingly, it is an option to lessen the amount of elastomer in upper components 2U as depicted in FIG. 1D by making the width $d_1$, of components 32U unequal to (preferably less than) the width $d_2$ of lower components 32L.

Figure 2C:
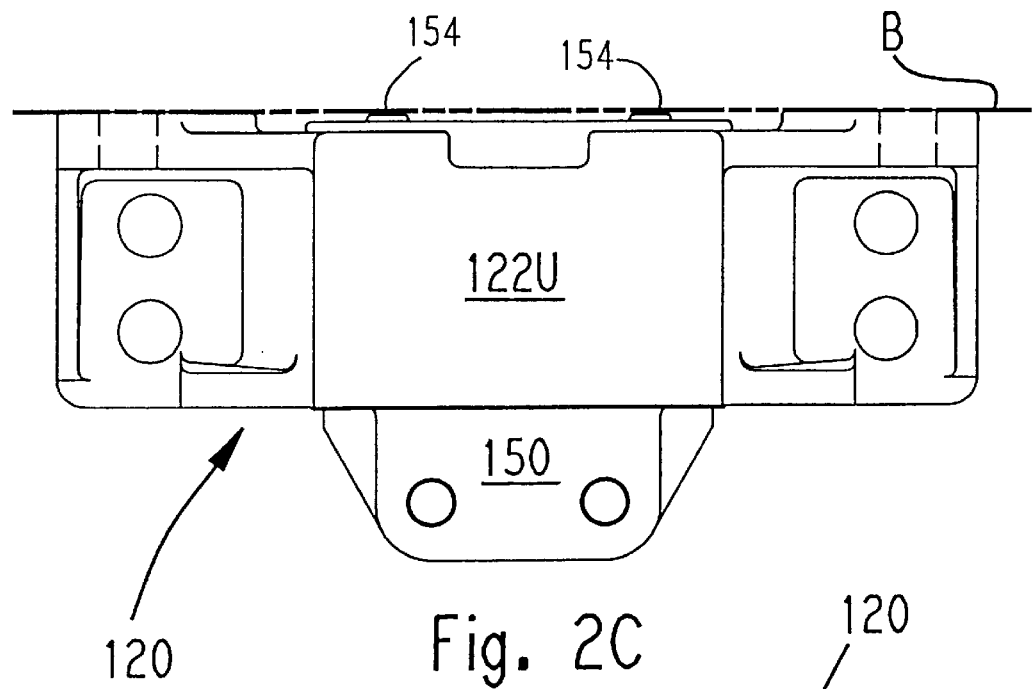
FIG. 2C is a top view of the second embodiment of mount.
Figure 2D:
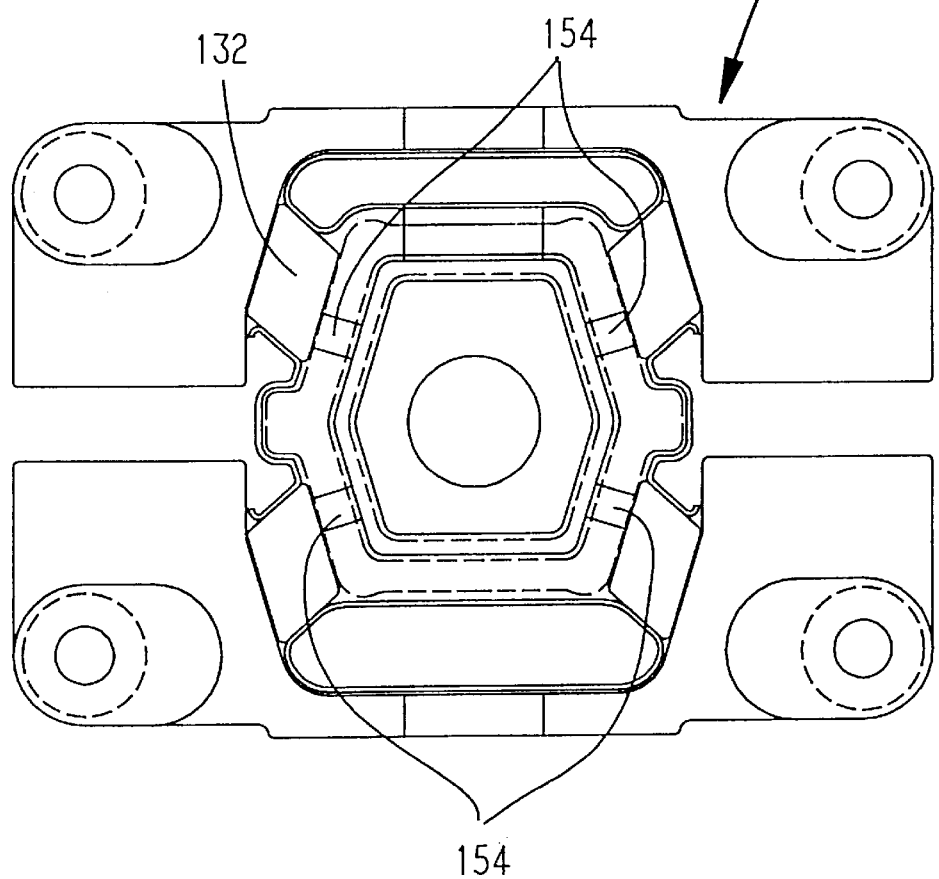
FIG. 2D is a back view of the second embodiment of the mount of the present invention shown in pre-installed condition.

A second embodiment of the mount of the present invention is shown in FIGS. 2A–2D generally at 120. This second embodiment of the mount 120 is also a split (bifurcated) outer member design employing upper element 122U and lower element 122L. Holes 135 are used to bolt the outer member 122 to the support frame, commonly a truck chassis. The inner member 126 is best seen in FIG. 2B. Compartments 131 are formed by the use of cores in the mold and an intermediate web 133I interconnects outer web 133A and inner web 133B. A laterally extending shelf 150 offset from outer member 122 protrudes from the front side of inner member 126 and provides a means for securing mount 120 to the engine (not shown). A flange extends from the engine and apertures formed therein receive the bolts 152. The apertures in the flange may be threaded to receive bolts 152 or the apertures may be through bores and nuts may be used to effect attachment.

As in the case of the first embodiment, when the mating surfaces 123U, 123L are drawn together from their pre-assembled condition (shown in FIG. 2D) to their fully assembled position shown in FIG. 2A, elastomeric components 132 are simultaneously preloaded in compression and shear. Rivets shown urge the mating surfaces 123U, 123L into contact and maintain precompression of the mounting 120 when not installed. Movement of the inner member 126 relative to outer member 122 will be snubbed in all three orthogonal directions. Vertical movement is snubbed by compression of the intermediate web 133I and the engagement of outer web 133A with inner web 133B. Fore-and-aft movement will be snubbed by the engagement of the elastomeric web 133B encasing inner member 126 with the fore-and-aft inner surfaces of outer member 122. A plurality of elastomeric protrusions 154 (FIGS. 2C, 2D) are formed on the outward face (away from the engine and toward frame) of inner member 126 and will snub lateral motion against the support frame (whose position is indicated by dotted line B in FIGS. 2C and 2B). This three axis snubbing prevents mechanical chatter caused by engine vibration during operation and prevents overloading the elastomeric components 132. The variation discussed in connection with the first embodiment of varying the width of the upper elastomeric components 132 relative to the lower ones is applicable to this embodiment and those that follow, as well.

Figure 3A:
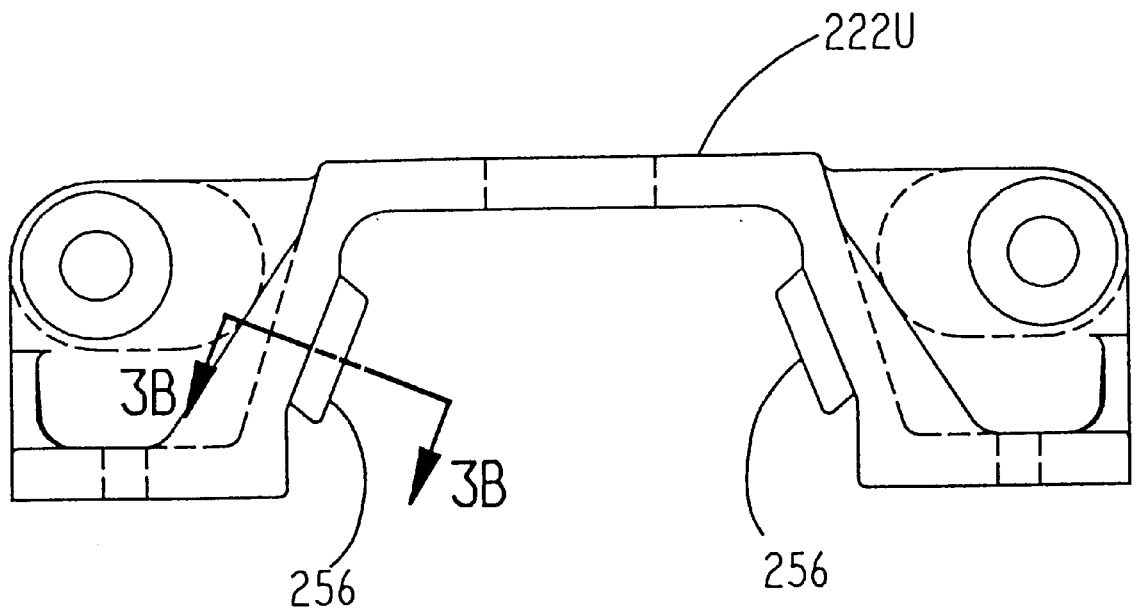
FIG. 3A is a front view of an upper portion of the bifurcated outer member of the mount of a third embodiment of the mount.
Figure 3B:
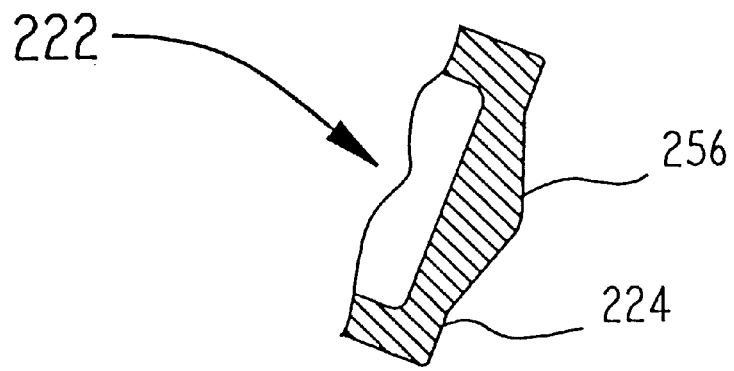
FIG. 3B is an enlarged cross-sectional side view of a portion of the outer member as seen along line 3B—3B in FIG. 3C is a front view of the inner member of the third embodiment of the mount.
Figure 3C:
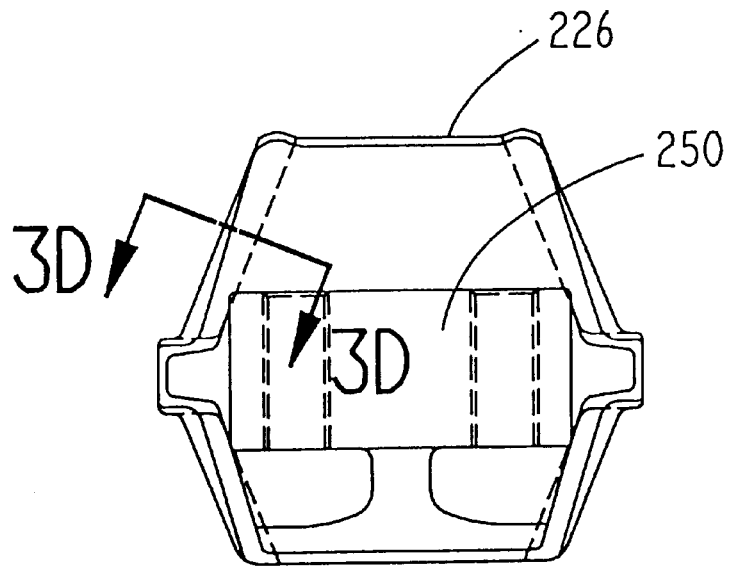
FIG. 3D is an enlarged cross-sectional side view of a portion of the inner member as seen along line 3D—3D of FIG. 3C.
FIG. 3E is an enlarged cross-sectional side view of the third embodiment of the mount showing the nonplanar opposing pairs of surfaces.
FIG. 3F is a cross-sectional side view of a third nonplanar modification to the third embodiment of the mount.
FIG. 3G is a cross-sectional side view of a lateral stiffness modification to the third embodiment of mount.
FIG. 3H is a cross-sectional side view of a second lateral stiffness modification to the third embodiment of the present invention.
Figure 3D:
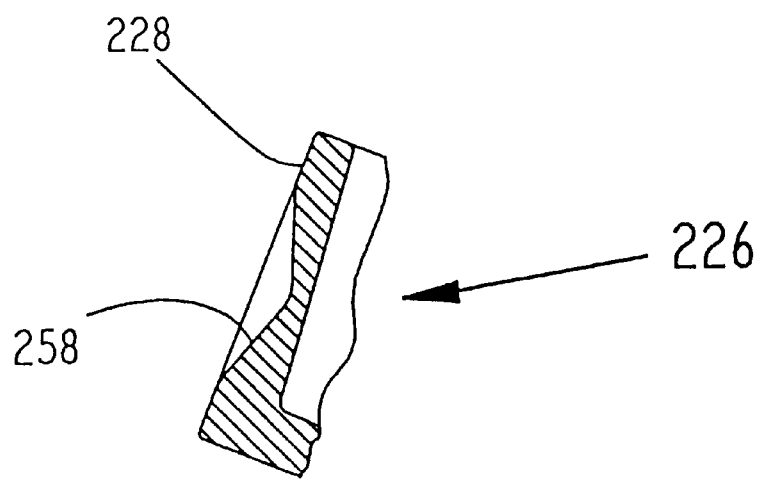
Figure 3E:
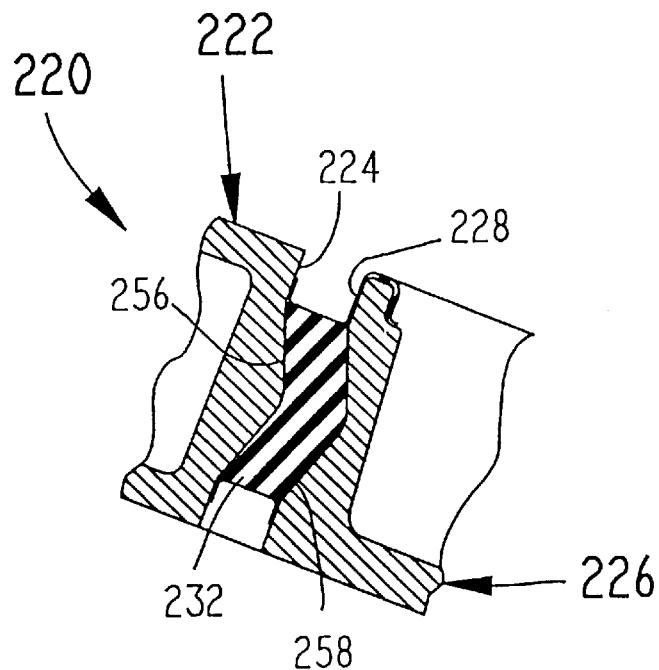

Portions of a third embodiment of the present invention are shown in FIGS. 3A–3E generally at 220. For some applications, it is desired to increase the lateral shear stiffness of the mount 220. This embodiment affords the desired increase in stiffness by providing the opposing surfaces 224, 228 on the outer (222) and inner (226) members with a non-planar configuration. As best seen in FIG. 3E, the configuration depicted is a laterally oriented V-shaped although other non-planar configurations, such as arcuate, might also be used. The elastomeric element 232 is deformed into a V shape by protrusion 256 and valley 258. These non-planar surfaces 224 and 228 will be formed on both upper element 222U (FIG. 3A) and lower element (not shown) and on inner (226) member. The shear stiffness of elastomeric elements 232 will be increased in the lateral direction transverse to the V.

Figure 3F:
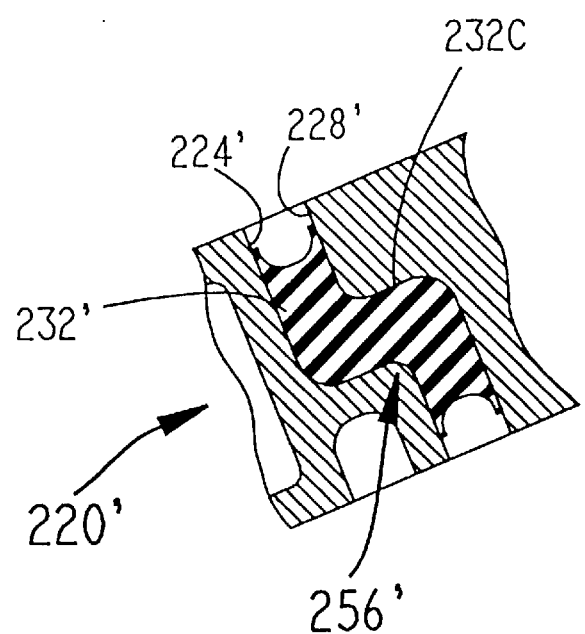

Another modification to the third embodiment is shown in FIG. 3F generally at 220'. Should the use of a chevron or V-shape to the elastomer be insufficient to produce a large enough increase in the stiffness in the lateral shear direction, an S-shaped protrusion 256' can be employed between outer surface 224' and inner surface 228'. This essentially inserts a compressive section 232C in the lateral direction and enables a larger incremental increase in the stiffness to be added without increasing the stiffness of the elastomer in elastomeric element 232'.

Figure 3H:
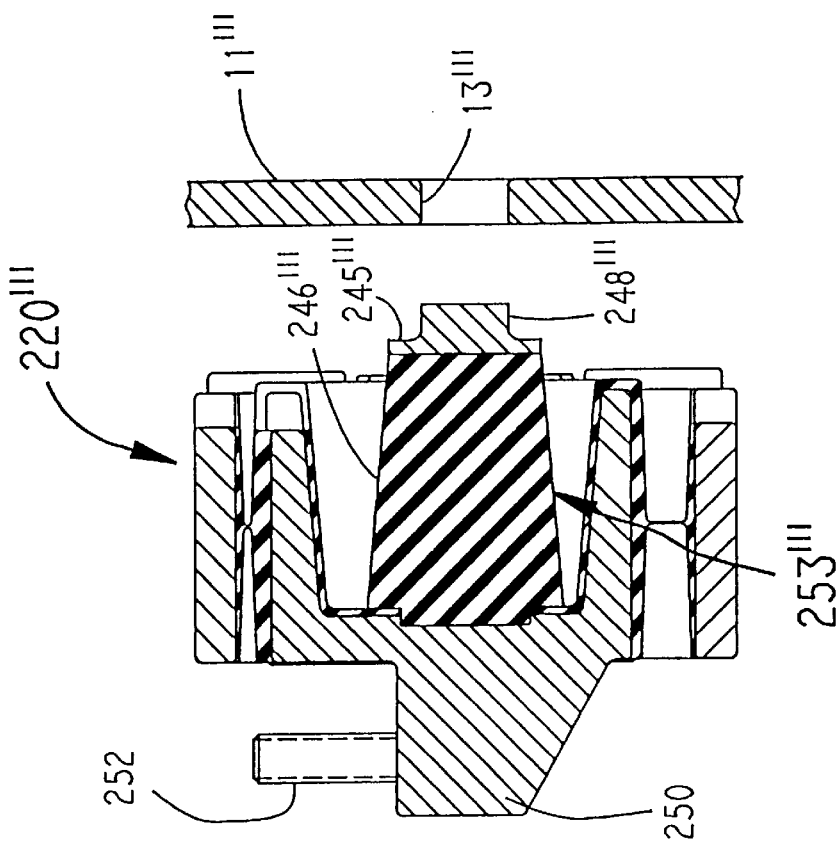
Figure 3G:
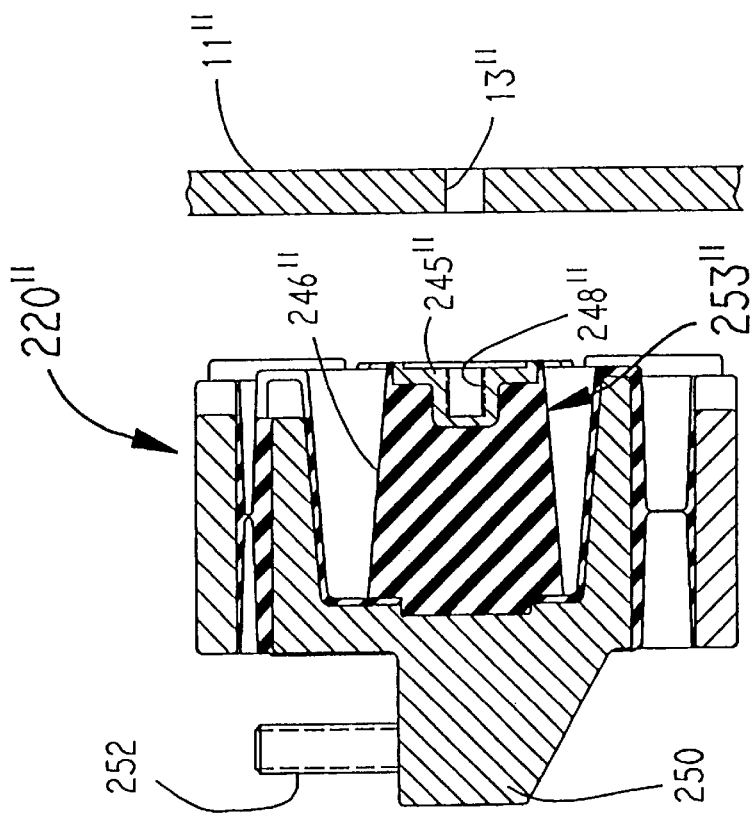

Second and third modifications to the third embodiment are shown in FIGS. 3G and H, respectively. In the mount 220'" shown in FIG. 3G, lateral stiffness is added to the mount 220'" by the addition of a separate laterally extending element 253'". The laterally extending element 253'" includes an elastomer element 246" bonded to a plate 245" which has means for interconnecting to the chassis 11'". For example, a threaded bore 248" in plate 245" receiving a fastener (not shown) inserted through opening 13" in chassis 11'". optionally, as is shown in FIG. 3H, a protruding boss 248'" formed on plate 245'" that engages in an opening 13'" in chassis 11'" may be used. Notably, use of a fastening bolt is rendered unnecessary by providing an axial preload on the laterally extending element 253'" thereby precompressing lateral elastomeric element 246'" when mount 220'" is bolted to chassis 11'". This preload will provide additional stiffness to the mount in this lateral direction, enabling the mount 220'" to meet the required stiffness criteria. In the two modifications depicted in FIGS. 3G and 3H, lateral stiffness can be added without having to affect the stiffness of the elastomer used in the precompressed elastomeric elements. As before, shelf 250 including bolts 252 attaches to the engine.

Figure 4A:
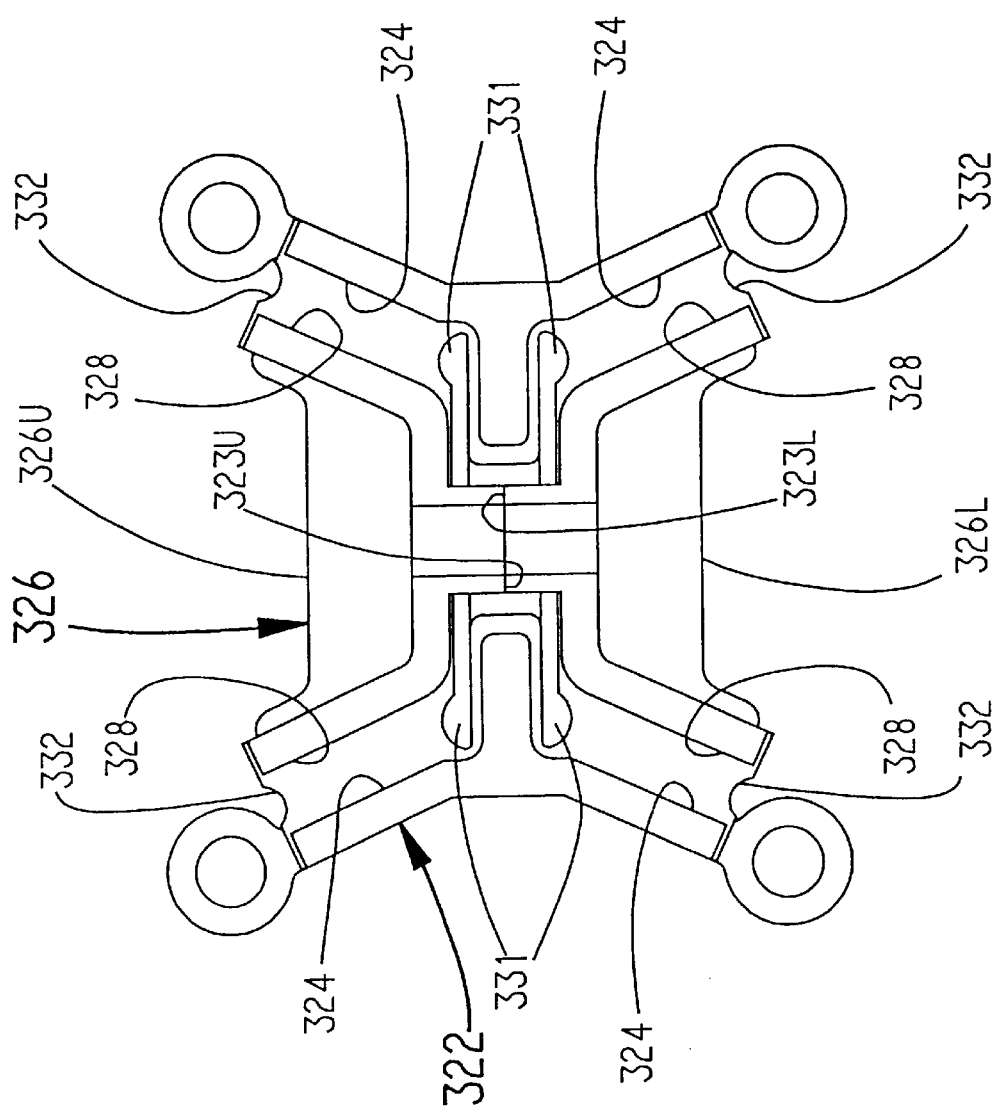
FIG. 4A is a front view of a fourth embodiment of the mount with a bifurcated inner member.

A fourth embodiment is depicted in FIG. 4A. In this embodiment, the outer member 322 is one piece and inner member 326 is split (bifurcated). Mating surfaces 323U and 323L are formed on upper element 326U and lower element 326L, of inner member 326 respectively. The outer member 322 no longer surrounds the inner member 326, as was the case in the previous embodiments. Rather, the reacting faces 324 of the outer member 322 are seemingly reversed, such that the surfaces 324 of the outer member are divergent and the actual halves of the inner member no longer form a closed perimeter either but have outwardly directed arms in which surfaces 328 are generally parallel to inwardly directed surfaces 324. The elastomeric components 332 then, too, are reversed so as not to form a closed polygon. Four laterally extending compartments 331 afford some room for movement of the inner member 326 relative to the outer member 322 before snubbing occurs. In this embodiment, it is the drawing of the mating surfaces 323U and 323L on the inner member 326 into contact that results in the preloading in the compressive and shear directions in the elastomeric elements 332. Snubbing is provided in all three orthogonal directions.

Figure 4B:
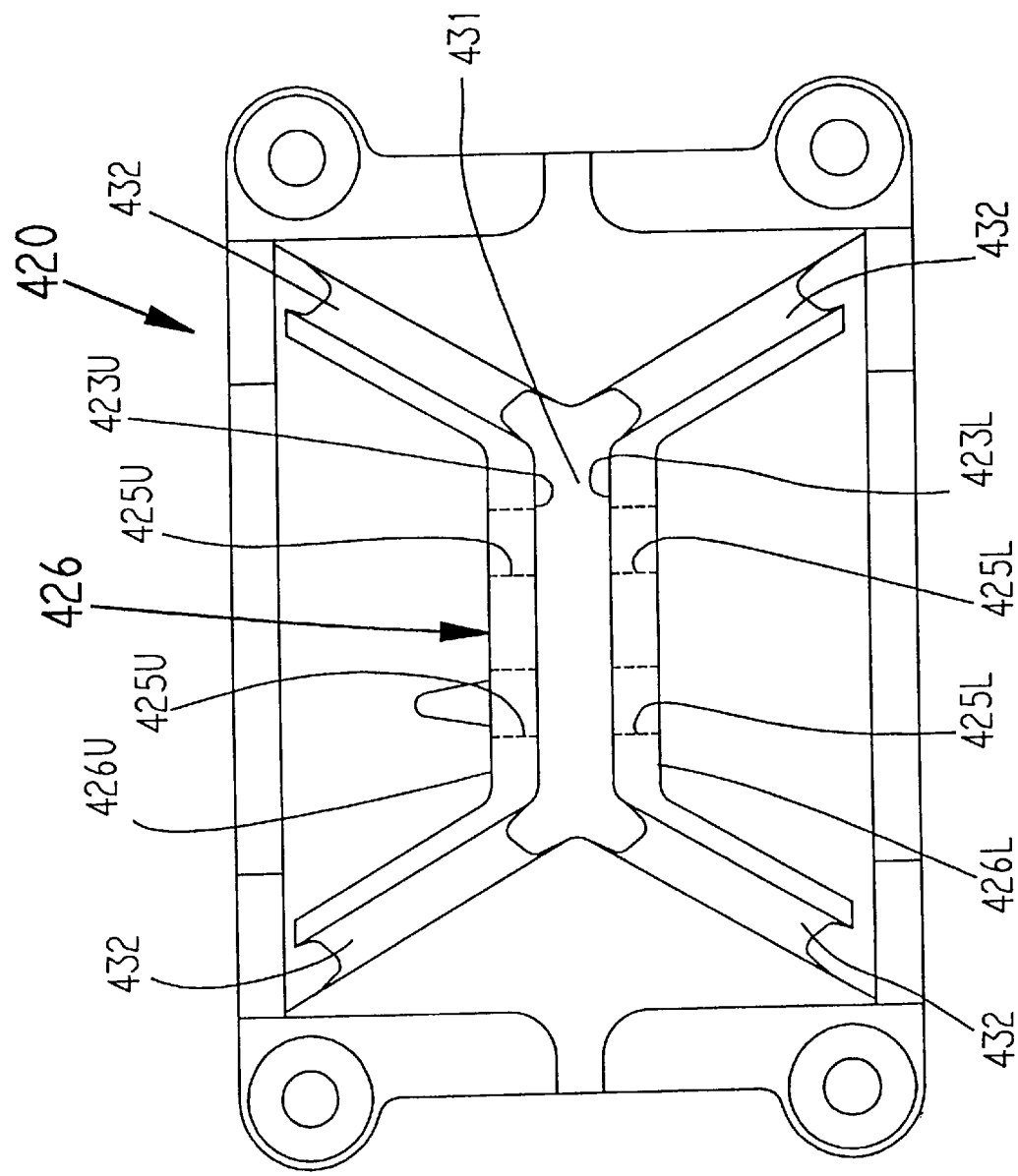
FIG. 4B is a front view of a fifth embodiment of the mount of the present invention similar to the fourth embodiment.

A fifth embodiment of mount 420 is shown in FIG. 4B. This embodiment, also has a split inner member 426 shown here in its pre-assembled position with elastomeric components 432 in an unloaded condition. In this embodiment, the mating surfaces 423U, 423L on upper (426U) and lower (426L) elements extend the full length of the bottoms of trough-shaped inner components 426U, 426L. When drawing down takes place during engine installation by inserting bolts or the like, into holes 425U, 425L, compartment 431 will be eliminated forming two smaller residual compartments at the ends of mating surfaces 423U, 423L. In these last two embodiments, an engine bracket is secured to the mount 320, 420 via bolts through the inner member holes 425U, 425L. The four holes shown through the outer members 322, 422 attach mounts 320, 420 to the frame.

Figures 5A, 5B:
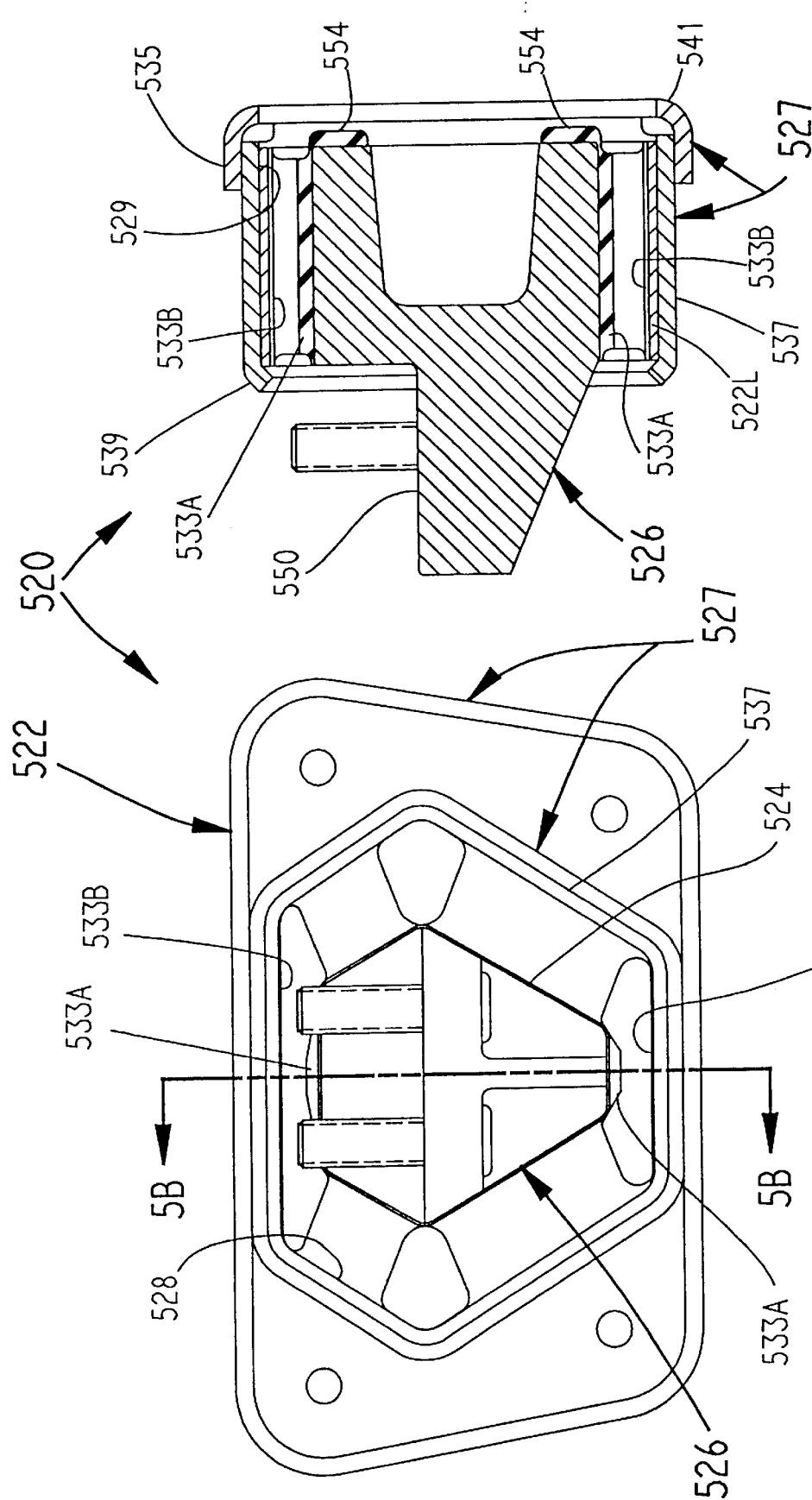
FIG. 5A is a front view of a sixth embodiment of the mount.
FIG. 5B is a cross-sectioned side view of the sixth embodiment along a section line 5B—5B shown in FIG. 5A.

A sixth embodiment is depicted in FIGS. 5A and 5B generally at 520. Outer surfaces 524 of inner member 526 are partially radiused as are the corners of the inner surfaces 528 of outer member 522. The outer member 522 is shown in its preassembly configuration in FIG. 5c. Outer member 522 is bifurcated into right sleeve portions 522R and left sleeve portions 522L which are precompressed together, thereby precompressing elastomer components 532U, 532L simultaneously in compression and shear. Once precompressed, the sleeves 522L, 522R are slid into, and received within, a pocket 529 formed in retaining plate 527. A projecting portion 537, which has pocket 529 formed therein, is welded to lip portion 535 of base plate 541 to form retaining plate 527. The right and left sleeve portions 522R, 522L are retained laterally within pocket 529 in retaining plate 527 by staking the edge of the projecting portion 537 at its terminal end 539. As with earlier embodiments, a shelf 550 provides a surface for attaching the engine. In this embodiment, the outer member 522 comprises retaining plate 527 and right and left sleeve portions 522R, 522L. Vertical snubbing in accomplished by inner web 533A contacting outer web 533B on portions of sleeves 522R, 522L. Lateral snubbing is dictated by elastomer protrusions 554 formed on the frame side of inner member 526. Fore-and-aft snubbing occurs when inner member 526 contacts fore-and-aft surfaces of sleeves 522R, 522L.

A seventh embodiment of the present invention is shown in FIGS. 6A–6C generally at 620. The basic configuration is similar to that of the second embodiment with inclined elastomeric components 632 being compressed between generally parallel surfaces 624, 628. As with the sixth embodiment, this design includes means to hold the mount 620 in its fully assembled condition without using fasteners. In this embodiment, a pair of fold-over tangs 660 are employed to retain engagement of the overlapping mating surfaces 623U, 623L. Upper element 622U is identical to lower element 622L (except for the tangs 660 being trimmed from the lower element) and hence, the tooling costs for producing these identical metal stampings can be greatly reduced. Inner member 626 will move downwardly under the engine load to a more centered position for better snubbing performance. An additional benefit of this embodiment is that the flanges 621U, 621L are continuous around the part enhancing the overall strength of the metallic elements of the mount 620. The metal used is preferably aluminum to reduce the weight of the mount.

Figures 7A, 7B:
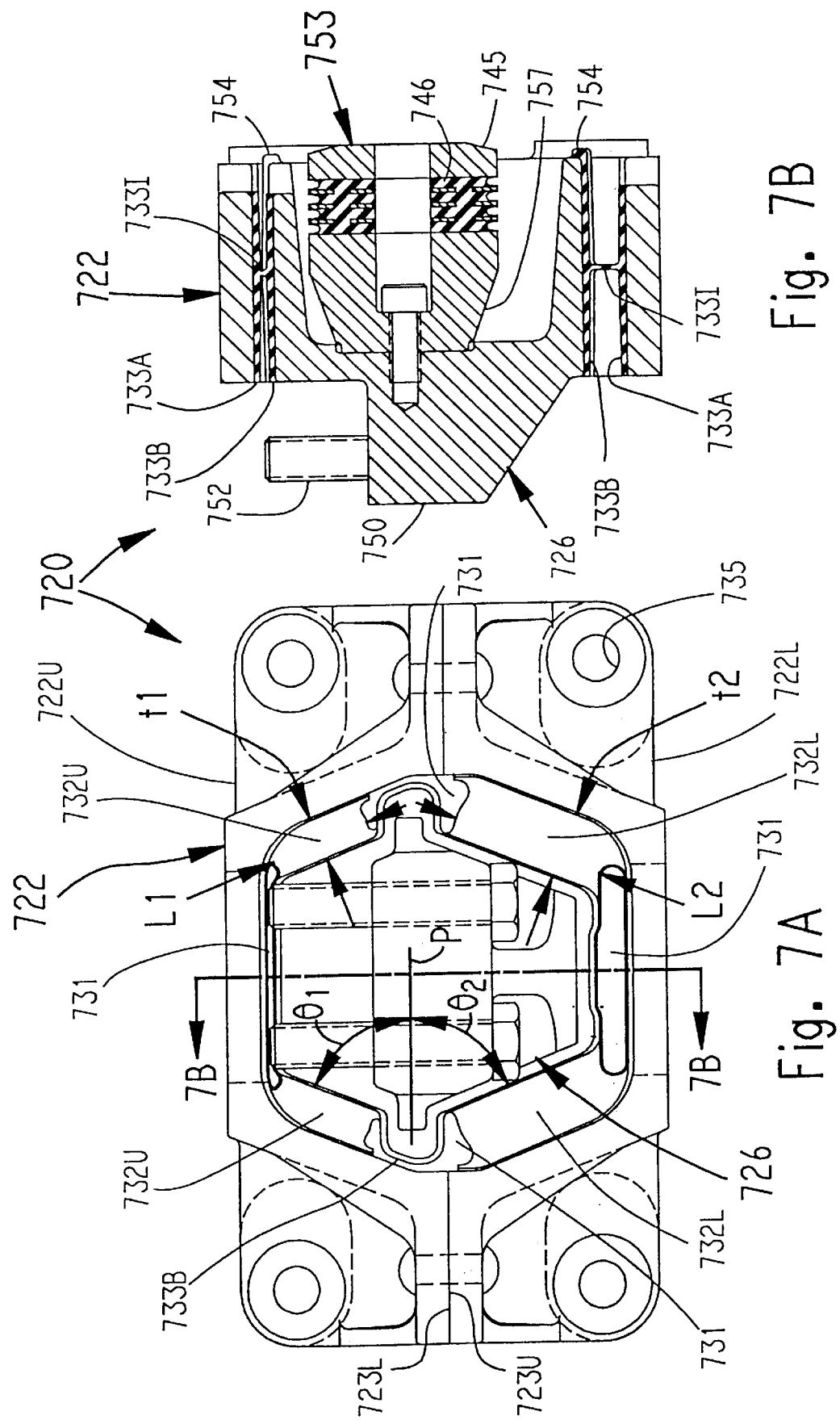
FIG. 7A is an front view of an eighth embodiment of the mount.
FIG. 7B is a cross-sectional side view of an eighth embodiment of the mount along the section line 7B—7B shown in FIG. 7A.

An eighth embodiment of the mount of the present invention is shown in FIGS. 7a and 7b generally at 720. This embodiment of the mount 720 is also a split (bifurcated) outer member design as is the FIGS. 2a and 2b embodiment employing upper element 722U and lower element 722L. Holes such as 735 are used to bolt the outer member 722 to the support frame, commonly a truck chassis. The inner member 726 is best seen in FIG. 7B. Compartments 731 are formed by the use of cores in the mold and an intermediate web 733I interconnects outer web 733A and inner web 733B. A shelf 750 protrudes from the front side of inner member 726 and provides a means for securing mount 720 to the engine (not shown). A flange extends from the rear of the engine and apertures therein receive bolts 752. The apertures in the flange may be attached as heretofore mentioned.

As was the case of the FIGS. 2a and 2b embodiment, when the mating surfaces 723U, 723L are drawn together from their pre-assembly position to their fully assembled position shown in FIG. 7A, upper and lower elastomeric components 732U, 732L are preloaded in both compression and shear. Preferably, in another aspect of the present invention, movement of the inner member 726 relative to outer member 722 will be snubbed in all three orthogonal directions. Vertical movement is snubbed by means of compression of the intermediate web 733I and the engagement of web 733A with web 733B. Fore-and-aft movement may be snubbed by means of the engagement of the elastomeric web 733B encasing inner member 726 with the fore-and-aft inner surfaces of the outer member 722. Elastomeric protrusions 154 (FIG. 7D) formed on the outward face of inner member 726 will snub lateral motion against the support frame (not shown). This three axis snubbing prevents mechanical chatter during operation and prevents elastomer overloading.

The first variation discussed in connection with the first embodiment embodies varying the width of the upper elastomeric components 732U relative to the lower ones 732L. In another variation, the thickness t1 of the upper elastomer sections 732U may differ (being preferably thinner) as compared to the thickness t2 of the lower section 732L. Third, the length L1 of the upper sections 732U may be different (preferably longer) than the length L2 of the lower section 732L. Notably, it is preferable that the incline angle of the upper and lower sections 732U, 732L from a horizontal plane intersecting the mount 720 (designated by line P) be the same, for example, an upper incline angle $\Theta 1$ is exactly equal to lower incline angle $\Theta 2$. In order to achieve the appropriate high fore-and-aft and lower vertical rates, it is preferable that the angle be greater than about 45 degrees. In particular, in a best mode, it is desired to achieve a 3 to 1 ratio of fore-and-aft spring rate to vertical spring rate. This is achieved by using about a 68 degree angle $\Theta 1$, $\Theta 2$. Notably, in the FIGS. 4a and 4b concepts having a bifurcated inner member, the upper elastomer components are preferably longer, wider, and thicker than the lower sections, as they predominantly carry the loads.

Preferably, one or more of these above-mentioned three features are incorporated and result in a spring rate of the lower section 732L which is greater than that of the upper section 732U. Preferably, the stiffness of the lower elastomer 732U in the vertical direction is two or more times stiffer, and more preferably about a factor of four stiffer, than the upper section 732U.

A removable lateral portion 753 is detachable from the inner member 722 and includes a laminated elastomer and shim lateral section 746 which provides additional lateral stiffness. In this embodiment, the lateral portion is removable for ease of tuning and substitution for different applications. The elastomer section 746 is bonded to the base portion 757 and the plate 745. Preferably, the lateral stiffness element increases the vertical stiffness to lateral stiffness ratio to about 1 to 4 or greater.

Referring to FIGS. 8A–8E, there is shown a ninth embodiment of a mount 820 according to the invention which includes two chevron-shaped elastic assemblies 822a and 822b of mirror symmetry preloaded in compression between an outer member 824 and an inner member 826.

Outer member 824 is a singular component defined by two parallel spaced brackets 824a and 824b projecting from a base 828 suitable for connecting to a support structure such as a vehicle chassis. Mutually facing sides of brackets 824a and 824b diverge symmetrically from each other on opposite sides of a plane $P_1$ and define planar upper and lower surfaces 830a and 830b inclined respectively outward at acute angles $\Theta$, and $\Theta_2$ above and below a horizontal plane $P_2$ passing through a line of intersection of the upper and lower surfaces. The angle of inclination affects the vertical, and fore-and-aft spring rates in assemblies 822a and 822b.

Inner member 826 is also a singular component secured between brackets 824a and 824b by elastic assemblies 822a and 822b. Upper and lower surfaces 832a and 832b are formed on opposite sides of inner member 826 in parallel spaced relation to surfaces 830a and 830b an amount sufficient for retaining elastic assemblies 822a and 822b in a precompressed condition between brackets 824a and 824b.

Figure 8A:
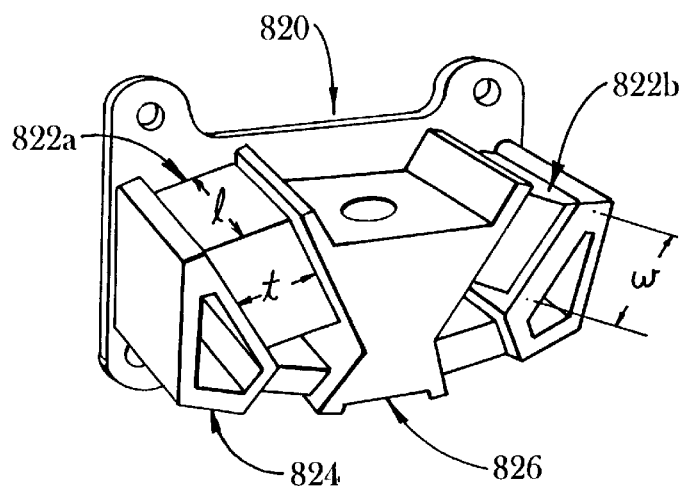
FIG. 8A is a pictorial representation of a ninth embodiment of the mount as assembled in a preloaded condition.
Figure 8E:
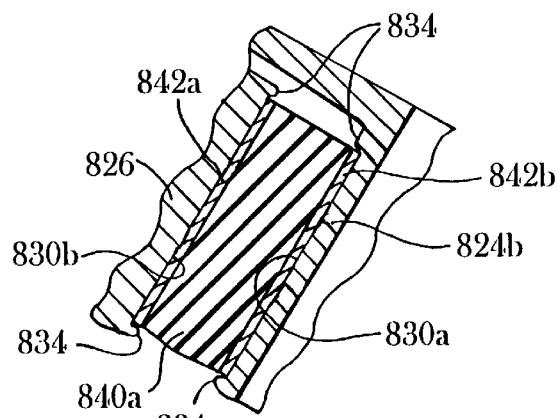
FIG. 8E is a view in cross section of an elastomeric element in the mount taken in a plane along the line 8E—8E of FIG. 8B.
Figure 8B:
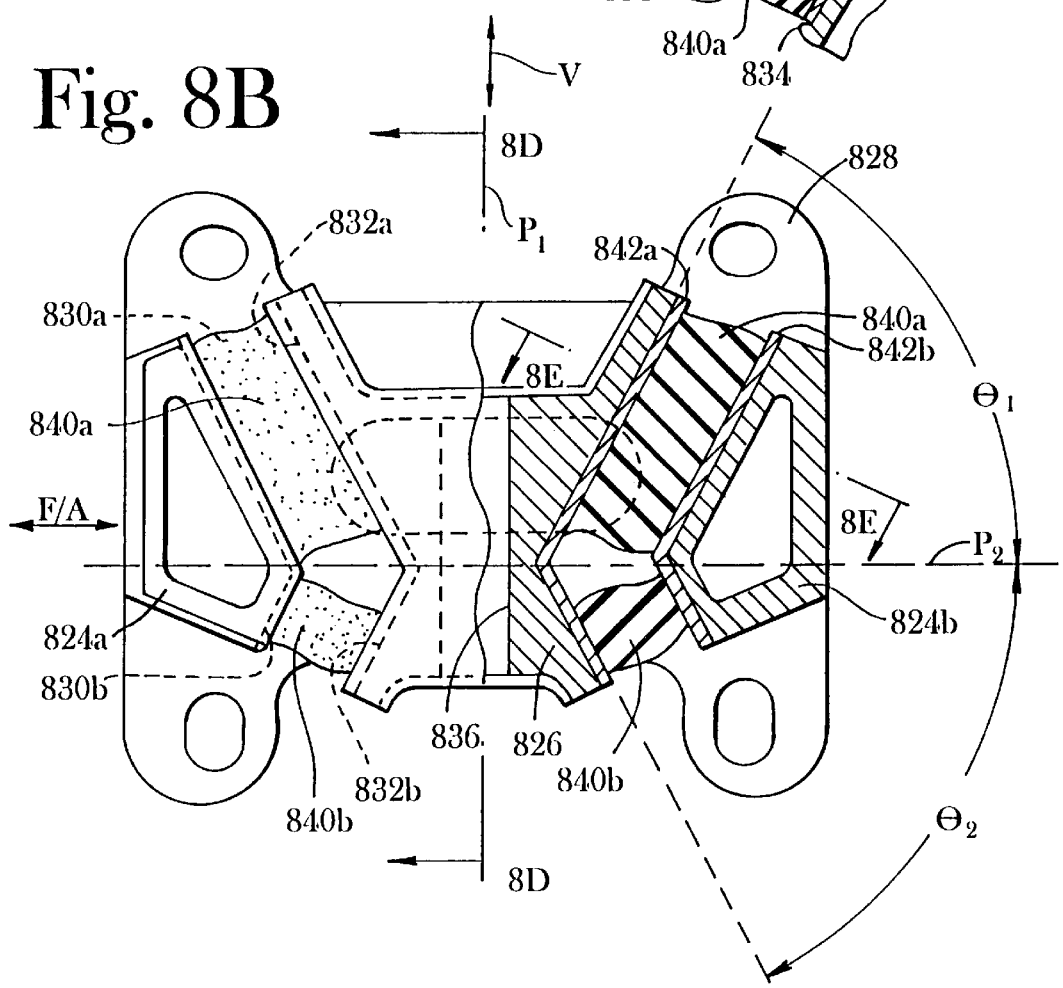
FIG. 8B a front view, partially in vertical cross section of the mount of FIG. 8A.
Figure 8C:
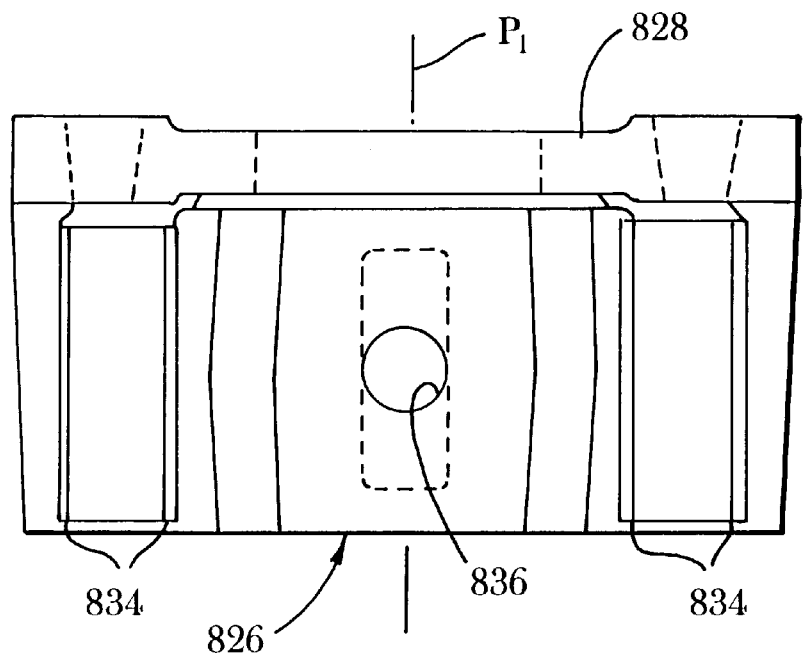
FIG. 8C is a top view of the mount.
Figure 8D:
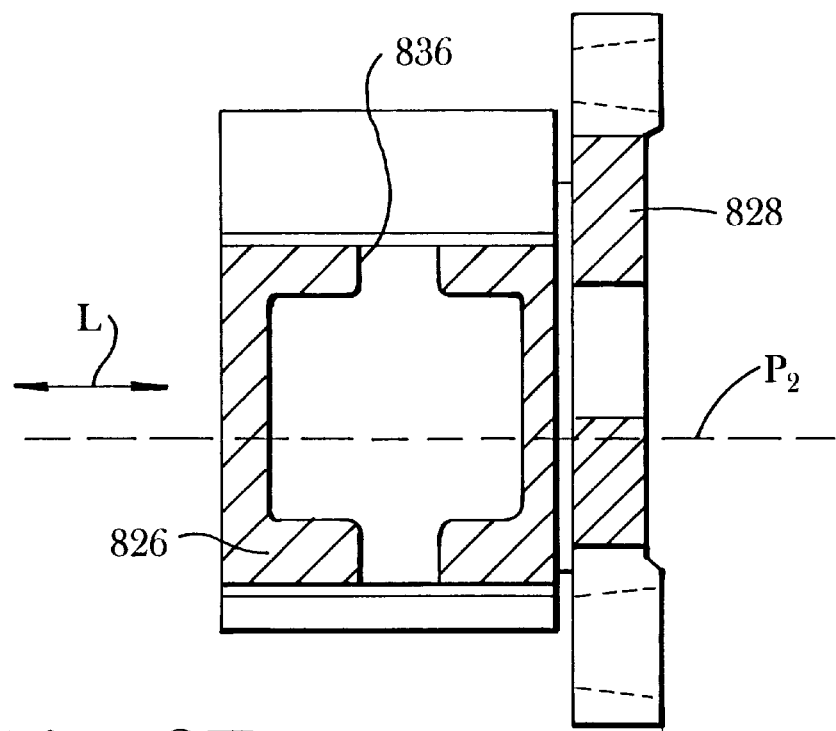
FIG. 8D is a view in cross section of the mount taken in a plane along the line 8D—8D of FIG. 8B.

As best illustrated in FIGS. 8C and 8E lips 834 at the opposite ends of surfaces 830a, 830b, 832a and 832b (FIG. 8B) form pockets for installing and positively restraining the elastic assemblies 822a and 822b in place. A hole 836 through inner member 826 along the symmetrical axis is formed to receive a connecting pin or bolt on a supported structure such as an engine.

As best seen in FIGS. 8B and 8E elastic assemblies 822a and 822b each comprise upper and lower elastomeric elements 840a and 840b bonded on opposite sides to inner and outer stamped plates 842a and 842b, sized and angled to fit snugly in the pockets of recessed surfaces 830a and 830b and surfaces 832a and 832b. The resulting X-configuration of assemblies 822a and 822b thusly formed in a vertical plane serves to isolate vibratory disturbances with equivalent efficiency under both positive and negative vertical loading conditions.

Precompression of elastic assemblies 822a and 822b enhances durability and increases load-carrying capacity of the mount. The precompression process is known in general. The outer member 824 is clamped in a jig with a funnel having spout openings congruent and communicating with the space between brackets 824a and 824b. The elastic assemblies are fit into the inner member 826 and together are placed in the top of the funnel in alignment with the spout openings and compressed through the spout openings into the pockets between members 824 and 826. The spring rates in shear and compression and the amount of construction determines the preload placed in the assembled mount.

A mount actually constructed according to the invention employed single castings of outer and inner members 824 and 826. Upper and lower elastic assemblies 822a and 822b are inclined equally at angles $\Theta$, and $\Theta_2$ of 68 degrees above and below a horizontal plane through brackets 824a and 824b. Elastomeric elements 840a and 840b are of natural rubber with a hardness of 56 durometers Shore A, 39 cm thick(t), and 78 cm long (l). The widths (w) of upper and lower elements 840a and 840b are 73 cm and 20 cm, respectively. These design parameters provide soft vertical and lateral nominal spring rates with a stiffness ratio of lateral and fore-and-aft loading to vertical loading are 0.5 and 3.0, respectively, as is generally desired in on-highway truck engine installations.

Various changes, alternatives and modifications to invention will become apparent to one of ordinary skill in the art after a reading of the foregoing specification. It is intended that all such changes, alternatives and modifications as come within the scope of the appended claims be considered part of the present invention.

What is claimed is:

1. A mount for supporting and isolating one member from another, comprising:

first means consisting of a single component formed to be connected to one of the members, said first means having a first pair of inclined inwardly facing surfaces diverging from each other on opposite sides of a first plane and said surface extending from respective ones of spaced apart central locations in a first direction from a second plane passing through the central locations and normal to the first plane, and a second pair of inclined inwardly facing surfaces diverging from each other on opposite sides of the first plane and extending from respective ones of said spaced apart locations in a second direction opposite from said first direction from the second plane;

second means consisting of a single component formed to be connected to the other of the members, said second means having outwardly facing surfaces in parallel spaced relation to respective ones of said inwardly facing surfaces and forming four opposed pairs of surfaces;

elastic means contiguously connected in compression between each of said opposed pairs of surfaces.

2. The mount of claim 1 wherein said elastic means includes first and second elastomeric assemblies each including an inner and an outer plate with an elastomer therebetween.

3. The mount of claim 2 wherein said elastomer comprises an upper element and a lower element spaced apart to form a cavity therebetween.

4. The mount of claim 3 wherein said upper element is greater in width than said lower element.

5. The mount of claim 3 wherein the thickness of said upper and lower elements in the compressed position are equal.

6. The mount of claim 1 wherein said opposed pairs of surfaces have protrusions forming pockets for restraining movement of said elastic means relative to said inner and outer members.

7. The mount of claim 1 wherein said surfaces are inclined at angles relative to said second plane for providing a soft vertical, a soft lateral and a stiff fore-to-aft spring rate.

8. The mount of claim 7 wherein said angles provide approximate fore-to-aft and lateral stiffness ratios relative to a vertical loading of 3:1, and 0.5:1, respectively.

9. The mount of claim 8 wherein said angles are approximately 68 degrees.

10. The mount of claim 1 wherein each of said first and second means have two of said opposed pairs of surfaces forming in cross section chevron shapes in a generally X-configuration.

11. The mount of claim 1 wherein said first means comprises an outer member of two parallel spaced bracket portions projecting from a base portion, said base portion including fastening means for connecting to the one member and said first and second pairs of inclined inwardly facing surfaces are formed on respective ones of said bracket portions.

12. The mount of claim 1 wherein said second means comprises an inner member with a central hole extending through said member in parallel with said first plane for connecting to the other of the members.

13. A mount, comprising:

(a) an outer member for connecting to a supporting structure, said outer member having arms extending therefrom in spaced parallel relation for defining a first pair of inclined inwardly facing surfaces diverging symetrically from each other on opposite sides of a first plane and extending from respective ones of spaced apart central locations in one direction from a second plane passing through the central locations and normal to the first plane, and said arms further defining a second pair of inclined inwardly facing surfaces diverging from each other on opposite sides of the first plane and extending from respective ones of said spaced apart locations in the opposite direction from the second plane;

(b) an inner member for connecting to a supported structure, said inner member having a first pair of inclined outwardly facing surfaces and a second pair of inclined outwardly facing surfaces, said first pair of inclined outwardly facing surfaces disposed in opposed relationship to said first pair of inclined inwardly facing surfaces and said second pair of inclined outwardly facing surfaces disposed in opposed relationship to said second pair of inclined inwardly facing surfaces; and (c) an elastomer element positioned between said inner and outer members, said elastomer element including first and second elastic assemblies each including an inner and outer plate having an elastomer therebetween, said first elastic assembly being positioned between said first pair of inclined outwardly facing surfaces and said first pair of inclined inwardly facing surfaces and said second elastic assembly being positioned between said second pair of inclined outwardly facing surfaces and said second pair of inclined inwardly facing surfaces; and (d) protrusion means for restraining movement of said inner and outer plates relative to said inner and outer members, respectively.

14. A mount, comprising:

a base for connecting to a supporting structure, said base having arms extending generally perpendicularly therefrom, in spaced parallel relation for defining inwardly facing surfaces diverging symmetrically from each other for forming a generally X-configuration in a plane normal to said surfaces;

an insert for connecting to a supported structure, said insert having outwardly facing surfaces juxtapositioned substantially in parallel with respective ones of said inwardly facing surfaces; and an elastomer element positioned between each of said inwardly and outwardly facing surfaces.

\* \* \* \* \*